(12) United States Patent
Wu et al.

(10) Patent No.: US 8,381,858 B2
(45) Date of Patent: Feb. 26, 2013

(54) HANDLEBAR FOLDING MECHANISM AND FOLDABLE MOTORIZED VEHICLE HAVING SAME

(75) Inventors: Chichun Wu, Dongguan (CN); Zhao Zhang, Dongguan (CN)

(73) Assignee: Chichun Wu, Dongguan, Guangdong Province (CN)

( * ) Notice: Subject to any disclaimer, the term of this patent is extended or adjusted under 35 U.S.C. 154(b) by 0 days.

(21) Appl. No.: 13/357,310

(22) Filed: Jan. 24, 2012

(65) Prior Publication Data
US 2012/0193160 A1    Aug. 2, 2012

(30) Foreign Application Priority Data

Jan. 28, 2011  (CN) ............... 2011 2 0029840 U
Jan. 28, 2011  (CN) ............... 2011 2 0029857 U

(51) Int. Cl.
*B62K 21/16*    (2006.01)
(52) U.S. Cl. ...... 180/208; 74/551.3; 74/551.4; 280/278; 280/287
(58) Field of Classification Search ............ 180/208, 180/334; 74/551.3, 551.4, 551.7, 551.1; 280/278, 287, 87.05, 655, 655.1; 296/181.7
See application file for complete search history.

(56) References Cited

U.S. PATENT DOCUMENTS

| | | | | |
|---|---|---|---|---|
| 645,884 A | * | 3/1900 | Blashfield | 74/551.4 |
| 647,366 A | * | 4/1900 | Blaker | 74/551.4 |
| 679,086 A | * | 7/1901 | Luce | 74/551.4 |
| 4,682,509 A | * | 7/1987 | Takamiya et al. | 74/551.4 |
| 6,234,042 B1 | * | 5/2001 | An | 74/551.5 |
| 8,230,758 B1 | * | 7/2012 | Eddy | 74/551.3 |

* cited by examiner

*Primary Examiner* — Drew Brown
(74) *Attorney, Agent, or Firm* — Morris Manning & Martin LLP; Tim Tingkang Xia, Esq.

(57) ABSTRACT

A handlebar folding mechanism for a foldable motorized vehicle comprising: (a) a mounting base, (b) a first connecting member and a second connecting member, each having a connection portion and a locking portion, (c) a first locking lever and a second locking lever, (d) a steering axial rod and (e) a first steering handlebar and a second steering handlebar, each of the steering handlebar having an inside end and outside end, wherein the connection portions of the connecting members are connected to the inside end of the first steering handlebar, the locking portions of the connecting members are pivoted on the mounting base, the locking levers are retractably mounted in the mounting base to control the rotation of the connecting members.

9 Claims, 7 Drawing Sheets

HANDLEBAR FOLDING MECHANISM AND FOLDABLE MOTORIZED VEHICLE HAVING SAME

CROSS-REFERENCE TO RELATED APPLICATIONS

This application claims priority to and benefit of, pursuant to 35 U.S.C. §119(a), Chinese Patent Application No. 201120029857.8, filed on Jan. 28, 2011, and Chinese Patent Application No. 201120029840.2, filed Jan. 28, 2011, the disclosures of which are incorporated herein by reference in their entireties.

FIELD OF THE PRESENT INVENTION

The present invention relates to a foldable motorized vehicle, and more particularly to a handlebar folding mechanism mounted on a foldable motorized vehicle for folding and locking of handlebar.

BACKGROUND OF THE PRESENT INVENTION

In order to save storage space and facilitate carrying, the current trend is to build a foldable motorized vehicle, and in order to meet different requirements in respect of folding, various folding and locking mechanisms have been designed on the motorized vehicle, among which folding, unfolding and locking mechanisms are the most commonly used.

In a conventional handlebar of foldable motorized vehicle, multiple locking holes are needed in a steering handle, the steering handle is pivoted on a bicycle handle main body, the steering handle is positioned by passing a locking shaft pin through one of the locking holes, and during folding, the steering handle is rotated so that the locking shaft pin passes through different locking holes, thereby achieving an objective of folding and locking. During locking and unlocking, the locking shaft pin is required to enter into or withdraw from the locking holes repeatedly. In such a structure, in order to enable the locking shaft pin to enter into and withdraw from the locking holes freely, not only a push lever is required to be used to drive the locking shaft pin to move, which results in a complex structure, but also a clearance is required to be kept between the locking hole and the locking shaft pin in respect of diameters for fitting. The reason is that if the locking hole and the locking shaft pin fit too closely, the locking shaft pin cannot easily enter into or withdraw from the locking hole, resulting in inconvenience when folding. Therefore, the locking holes is required to be configured with a greater diameter, but if the diameter of the locking holes is greater than that of the locking shaft pin, another problem occurs. When the steering handle is unfolded and locked, the steering handle slightly rotates or becomes loose along the axis of the locking shaft, thereby making a rider feel that the locking is not rigid and secure, which in turn affects the rider's sense of security and safety.

Therefore, a heretofore unaddressed need exists in the art to address the aforementioned deficiencies and inadequacies.

SUMMARY OF THE PRESENT INVENTION

The present invention is related to a handlebar folding mechanism for a foldable motorized vehicle. In one embodiment, the handlebar folding mechanism includes: (a) a mounting base, (b) a first connecting member and a second connecting member, (c) a first locking lever and a second locking lever, (d) a steering axial rod, and (e) a first steering handlebar and a second steering handlebar. The mounting base has a first end, a second end, a front sidewall, a rear sidewall, a first pivoting hole, a second pivoting hole, a first locking hole, and a second locking hole. Each of the first connecting member and the second connecting member has a connection portion and a locking portion. The steering axial rod has a top end and bottom end. The bottom end of the steering axial rod is connected to a front wheel stem of the foldable motorized vehicle, and the top end of the steering axial rod is connected to the center of the mounting base. Each of the first steering handlebar and the second steering handlebar has an inside end and outside end.

In one embodiment, the connection portion of the first connecting member is connected to the inside end of the first steering handlebar, and the connection portion of the second connecting member is connected to the inside end of the second steering handlebar, respectively. The locking portion of the first connecting member is pivoted on the first pivoting hole of the mounting base, and the locking portion of the second connecting member is pivoted on the second pivoting hole of the mounting base, respectively. The first locking lever is retractably mounted in the first locking hole of the mounting base to control the rotation of the first connecting member, and the second locking lever is retractably mounted in the second locking hole of the mounting base to control the rotation of the second connecting member.

In one embodiment, a side surface of the locking portion of the first connecting member is recessed along a folding direction of the first steering handlebar to form an arc-shaped sliding portion with each of the sliding portion forming a side edge, and a side surface of the locking portion of the second connecting member is recessed along a folding direction of the second steering handlebar to form an arc-shaped sliding portion with each of the sliding portion forming a side edge. The sliding portion of the first connecting member protrudes along the folding direction of the first steering handlebar to form a protruding edge, and the sliding portion of the second connecting member protrudes along the folding direction of the second steering handlebar to form a protruding edge. The protruding edge of the first connecting member divides its sliding portion into two parts, both ends of the protruding edge form a locking slot with a side edge of a recessed part of the sliding portion, and the protruding edge of the second connecting member divides its sliding portion into two parts, both ends of the protruding edge form a locking slot with a side edge of a recessed part of the sliding portion.

In one embodiment, the each of the first locking lever and the second locking lever has (a) a front pressing portion, (b) a rear pressing portion, (c) a flange, and (d) a release slot.

The first locking lever protrudes radially to form a front pressing portion at a front end of the first locking lever, wherein the front pressing portion pass through the first locking hole of the front sidewall of the mounting base in an elastically retractable manner, and the second locking lever protrudes radially to form a front pressing portion formed at a front end of the second locking lever, wherein the front pressing portion pass through the second locking hole of the front sidewall of the mounting base in an elastically retractable manner. The rear pressing portion of the first locking lever and the second locking lever are formed at a rear end of the locking levers, and the rear pressing portions presses against the rear sidewall of the mounting base. The flange corresponds to the locking slots of the first connection member and the second connection member. The release slot for the protruding edge to pass through is formed between the front pressing portion and the flange. The locking slot extends and runs through the side edge of the recessed part of the sliding portion. The angle between the two locking slots formed by the two ends of the protruding edge and the side edges of the recessed part of the sliding portion is about 90°. The protruding edge is arc-shaped.

In one embodiment, the handlebar folding mechanism further comprises a first spring, and a second spring. The first spring is sleeved on the first locking lever and presses between the flange of the first locking lever and the rear sidewall of the mounting base. The second spring is sleeved on the second locking lever and presses between the flange of the second locking lever and the rear sidewall of the mounting base.

In one embodiment, when the first locking lever is pressed in against the resilient force of the first spring, the release slot of the first locking lever moves backward towards the rear sidewall of the mounting base along one of the locking slots such that the protruding edge pass through the release slot of the first locking lever and the first handlebar can be rotated. When the second locking lever is pressed in against the resilient force of the second spring, the release slot of the second locking lever moves backward towards the rear sidewall of the mounting base along one of the locking slots such that the protruding edge pass through the release slot of the second locking lever and the second handlebar can be rotated.

In another aspect, the present invention relates to a foldable motorized vehicle comprising the handlebar folding mechanism as disclosed above.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

Further features and benefits of the present invention will be apparent from a detailed description of preferred embodiments thereof taken in conjunction with the following drawings, wherein similar elements are referred to with similar reference numbers, and wherein.

DETAILED DESCRIPTION OF THE PRESENT INVENTION

Figure 1:
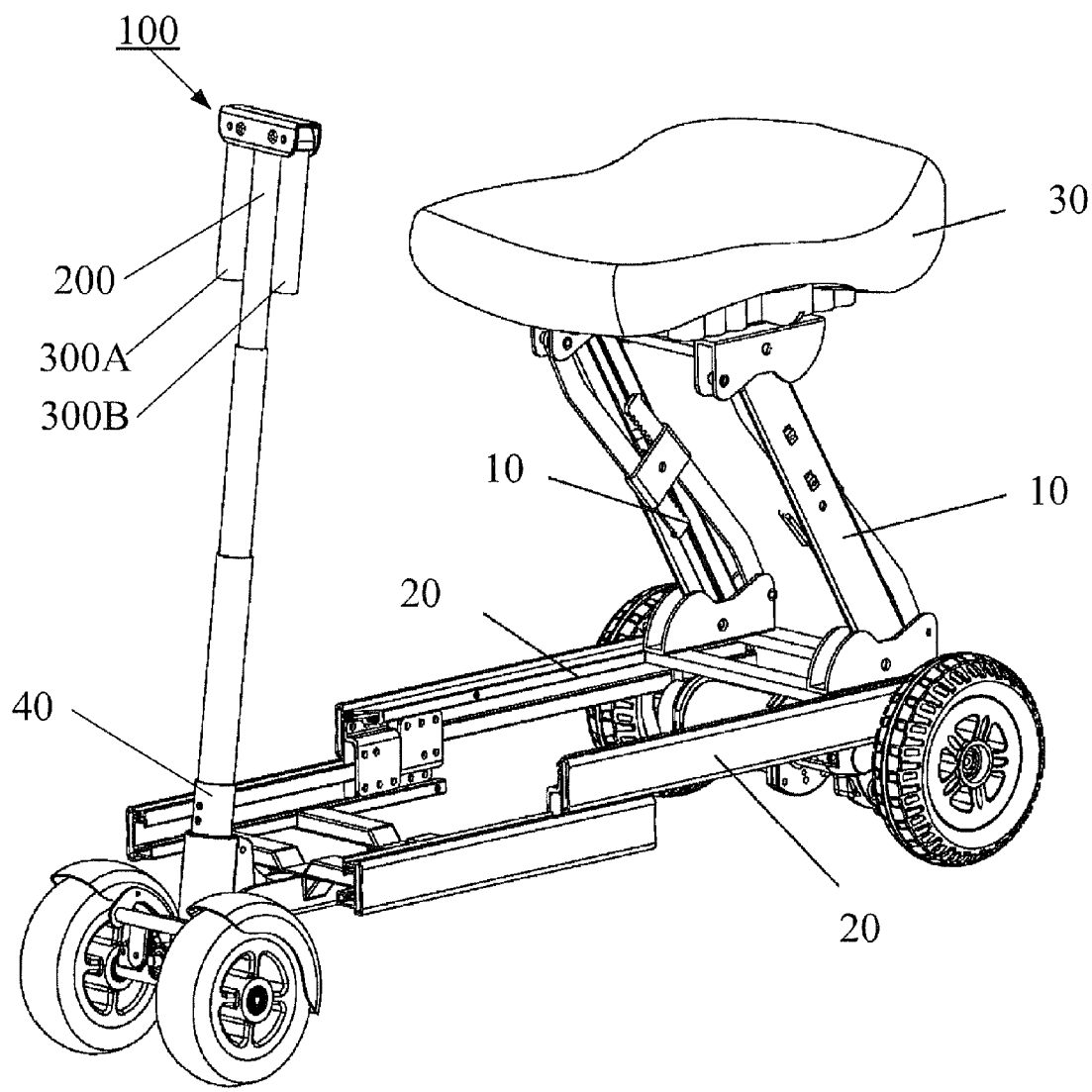
FIG. 1 is an abbreviated perspective view of a foldable motorized vehicle according one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising," "including," "having," "containing," "involving," and the like are to be understood to be open-ended, i.e., to mean including but not limited to.

Embodiments of the present invention are described below with reference to the accompanying drawings, and in the accompanying drawings like reference numerals represent like elements.

Referring now to FIG. 1, a perspective view of a foldable motorized vehicle is shown according one embodiment of the present invention. The foldable motorized vehicle has: (a) a foldable frame body 20, (b) a foldable seat mounting rack 10, (c) a seat 30, (d) a front wheel steering mechanism 40, and (e) handlebar folding mechanism 100 with two foldable handlebars 300A and 300B, and a steering axial rod 200. As it is shown in FIG. 1, the seat, the frame body, and steering are all foldable so that the entire vehicle is foldable to save storage space.

Figure 2:
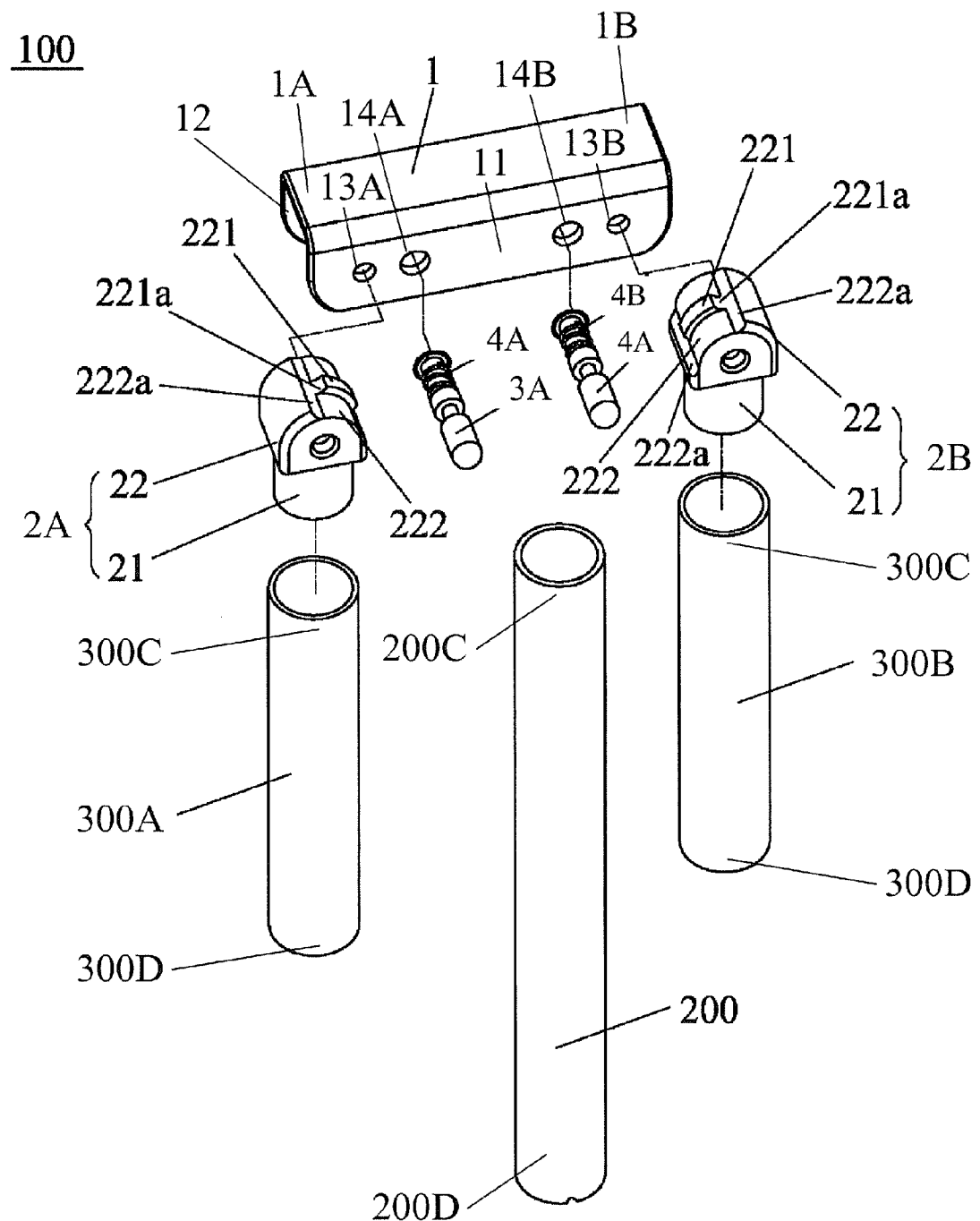
FIG. 2 is an exploded view of a handlebar folding mechanism according to one embodiment of the present invention.

In FIG. 2, an exploded view of a handlebar folding mechanism is shown according to one embodiment of the present invention. In one embodiment, the handlebar folding mechanism 100 for a foldable motorized vehicle has: (a) a mounting base 1, (b) a first connecting member 2A and a second connecting member 2A, (c) a first locking lever 3A and a second locking lever 3B, (d) a steering axial rod 200, and (e) a first steering handlebar 300A and a second steering handlebar 300B. The mounting base 1 has a first end 1A, a second end 1B, a front sidewall 11, a rear sidewall 12, a first pivoting hole 13A, a second pivoting hole 13B, a first locking hole 14A, and a second locking hole of 14B. Each of the first connecting member 2A and the second connecting member 2B has a connection portion 21 and a locking portion 22. The steering axial rod 200 has a top end 200C and bottom end 200D. The bottom end 200D of the steering axial rod 200 is connected to a front wheel stem of the foldable motorized vehicle, and the top end 200C of the steering axial rod 200 is connected to the center of the mounting base 1. Each of the first steering handlebar 300A and the second steering handlebar 300B has an inside end 300C and outside end 300D. The connection portion 21 of the first connecting member 2A is connected to the inside end 300C of the first steering handlebar 300A and the connection portion 21 of the second connecting member 2A is connected to the inside end 300C of the second steering handlebar 300B, respectively. The locking portion 22 of the first connecting member 2A is pivoted on the first pivoting hole 13A of the mounting base 1, and the locking portion 22 of the second connecting member 2B is pivoted on the second pivoting hole 13B of the mounting base 1, respectively. The first locking lever 3A is retractably mounted in the first locking hole 14A of the mounting base 1 to control the rotation of the first connecting member 2A, and the second locking lever 3B is retractably mounted in the second locking hole 14B of the mounting base 1 to control the rotation of the second connecting member 2B.

In one embodiment, a side surface of the locking portion 22 of the first connecting member 2A is recessed along a folding direction of the first steering handlebar 300A to form an arc-shaped sliding portion 222 with each of the sliding portion forming a side edge 222a, and a side surface of the locking portion 22 of the second connecting member 2B is recessed along a folding direction of the second steering handlebar 300B to form an arc-shaped sliding portion 222 with each of the sliding portion forming a side edge 222a. The sliding portion 222 of the first connecting member 2A protrudes along the folding direction of the first steering handlebar 300A to form a protruding edge 221, and the sliding portion 222 of the second connecting member 2B protrudes along the folding direction of the second steering handlebar 300B to form a protruding edge 221. The protruding edge 221 of the first connecting member 2A divides its sliding portion 222 into two parts, both ends of the protruding edge 221 form a locking slot 221a with a side edge of a recessed part of the sliding portion 222, and the protruding edge 221 of the second connecting member 2B divides its sliding portion 222 into two parts, both ends of the protruding edge 221 form a locking slot 221a with a side edge of a recessed part of the sliding portion 222.

Figure 3:
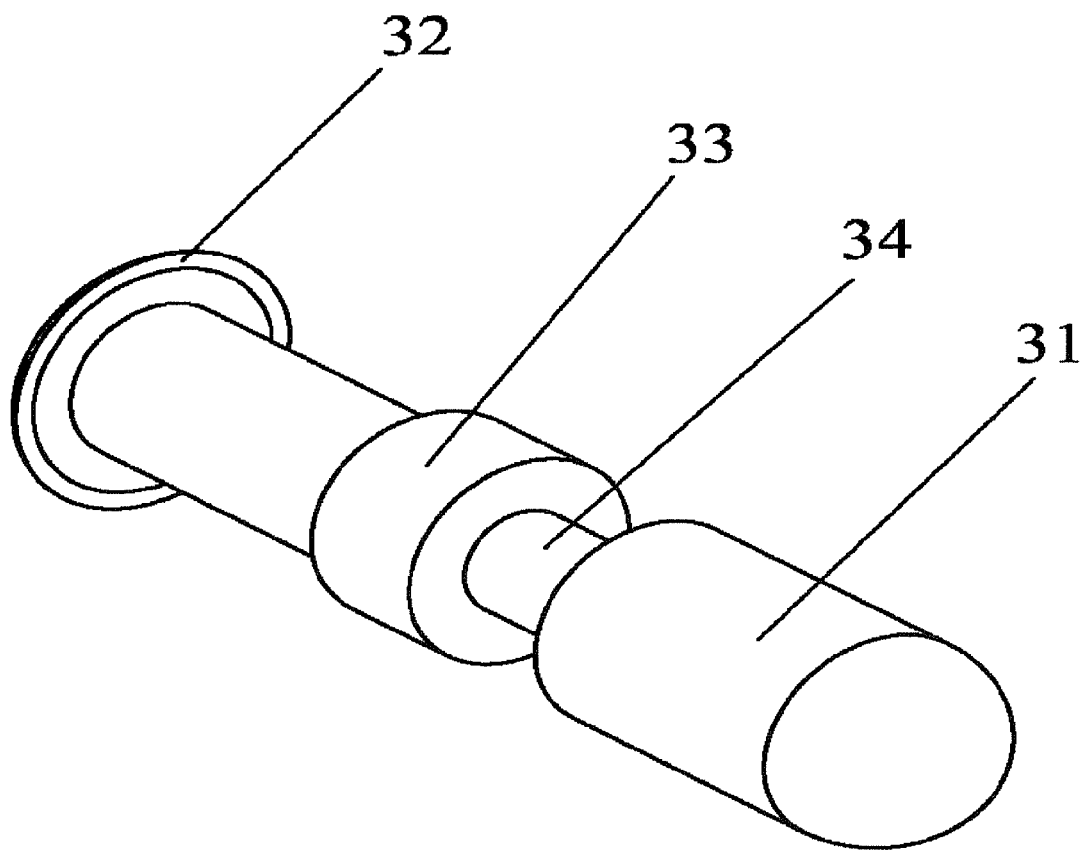
FIG. 3 is a perspective structural view of a locking lever according to one embodiment of the present invention.

In one embodiment, as shown in FIG. 3, the first locking lever 3A and the second locking lever 3B protrudes radially to form (a) a front pressing portion 31, (b) a rear pressing portion 32, (c) a flange 33, and (d) a release slot 34.

The front pressing portion 31 is formed at the front end of the first locking lever 3A and the front end of the second locking lever 3B. The front pressing portion 31 pass through the first locking hole 14A and the second locking hole 14B of the front sidewall 11 of the mounting base 1 in an elastically retractable manner. The rear pressing portion 32 is formed at the rear end of the first locking lever 3A and the second locking lever 3B. The rear pressing portion 32 presses against the rear sidewall 12 of the mounting base 1. The flange 33 corresponds to the locking slot 221a of the first connection member 2A and the locking slot 221a of the second connection member 2B. The release slot 34 for the protruding edge 221 to pass through is formed between the front pressing portion 31 and the flange 33.

In one embodiment, the handlebar folding mechanism 100 further includes a first spring 4A, and a second spring 4B. The first spring 4A is sleeved on the first locking lever 3A and presses between the flange 33 of the first locking lever 3A and the rear sidewall 12 of the mounting base 1, and the second spring 4B is sleeved on the second locking lever 3B and presses between the flange 33 of the second locking lever 3B and the rear sidewall 12 of the mounting base 1.

The locking slot 221a extends and runs through the side edge 222a of the recessed part of the sliding portion 222. The angle between the two locking slots 221a formed by the two ends of the protruding edge 221 and the side edges 222a of the recessed part of the sliding portion 222 is about 90°. The protruding edge 221 is arc-shaped.

In one embodiment, when the first locking lever 3A is pressed in against the resilient force of the first spring 4A, the release slot 34 of the first locking lever 3A moves backward towards the rear sidewall 12 of the mounting base 1 along one of the locking slots 221a such that the protruding edge 221 pass through the release slot 34 of the first locking lever 3A and the first handlebar 300A can be rotated, thus the first handlebar 300A and the first connecting member 2A can be folded or unfolded. When the second locking lever 3B is pressed in against the resilient force of the second spring 4B, the release slot 34 of the second locking lever 3B moves backward towards the rear sidewall 12 of the mounting base 1 along one of the locking slots 221a such that the protruding edge 221 pass through the release slot 34 of the second locking lever 3B and the second handlebar 300B can be rotated, thus the second handlebar 300B and the second connecting member 2B can be folded or unfolded.

Figure 4:
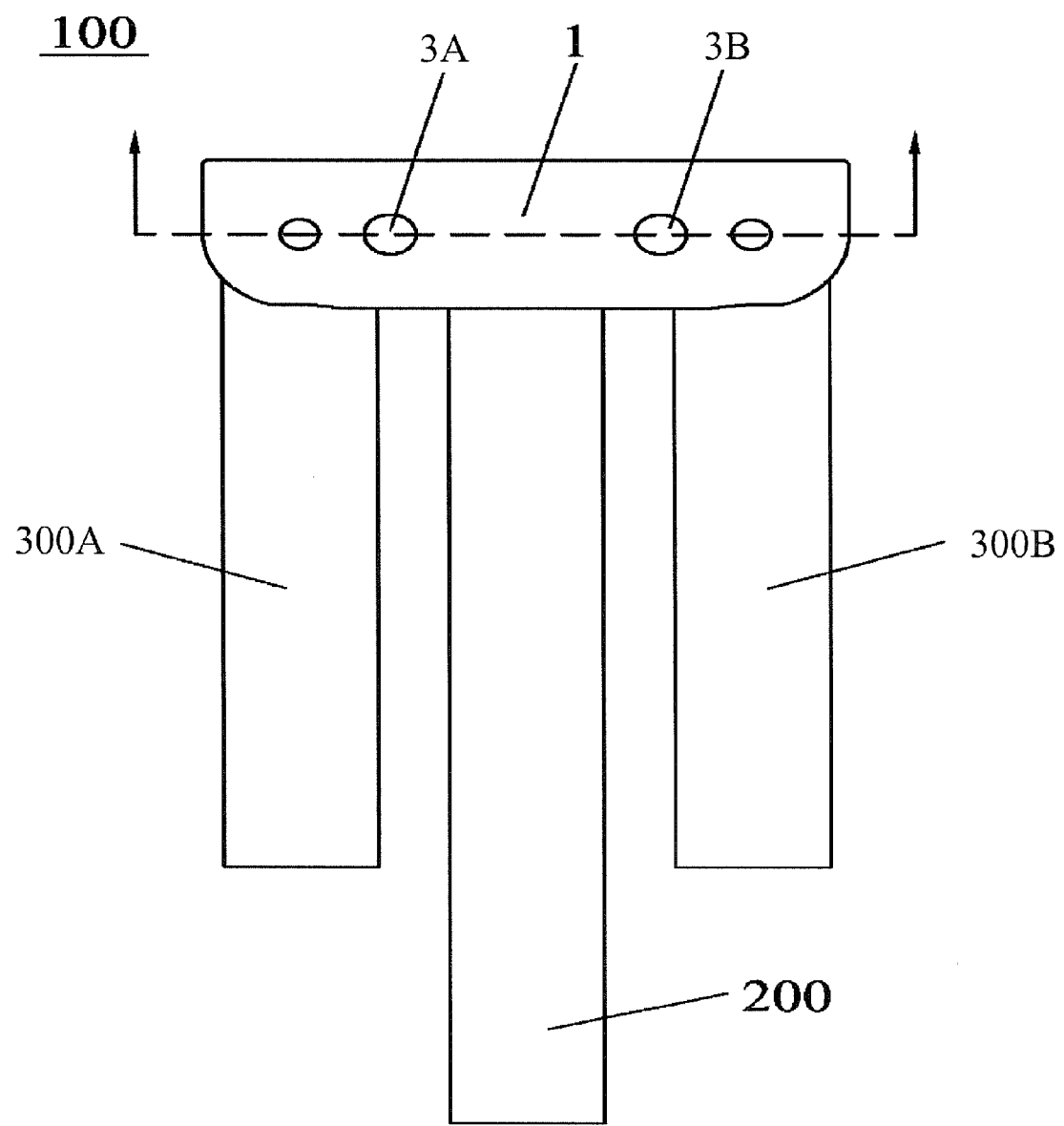
FIG. 4 is a side view of a handlebar folding mechanism when both handlebars are folded and locked according to one embodiment of the present invention.
Figure 5:
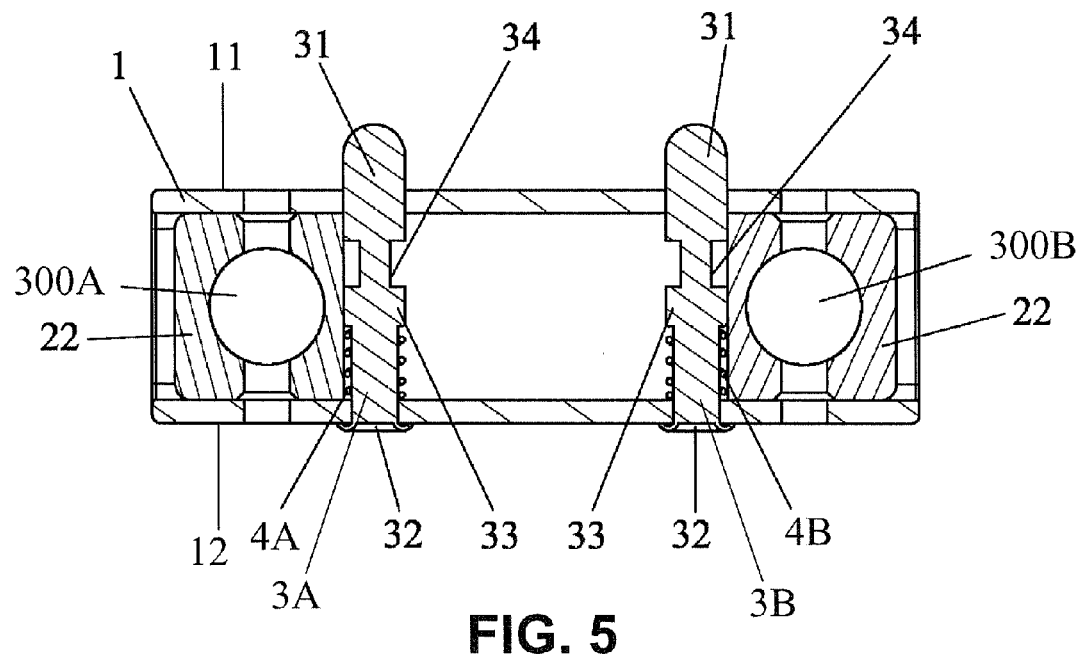
FIG. 5 is a sectional view of a handlebar folding mechanism when both handlebars are locked along an A-A direction in FIG. 4 according to one embodiment of the present invention.
Figure 6:
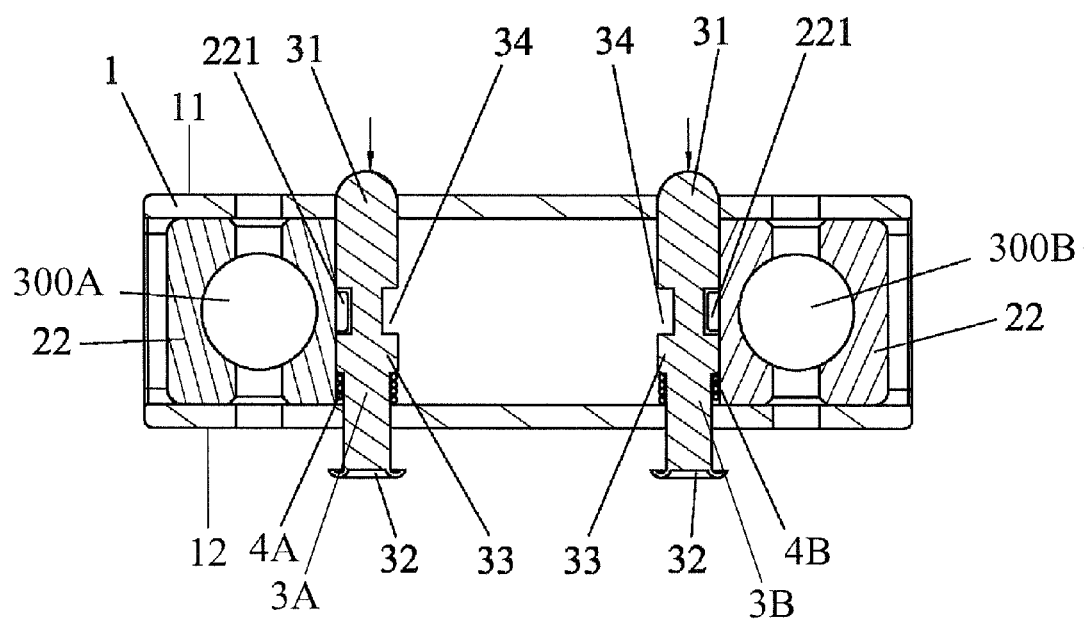
FIG. 6 is a sectional view of a handlebar folding mechanism when both handlebars are unlocked along an A-A direction in FIG. 4 according to one embodiment of the present invention.

According to one embodiment of the present invention, FIG. 4 shows a side view of a handlebar folding mechanism when both handlebars are folded and locked. FIG. 5 shows a sectional view of a handlebar folding mechanism when both handlebars are locked along an A-A direction in FIG. 4. FIG. 6 shows a sectional view of a handlebar folding mechanism when both handlebars are unlocked along an A-A direction in FIG. 4.

Figure 7:
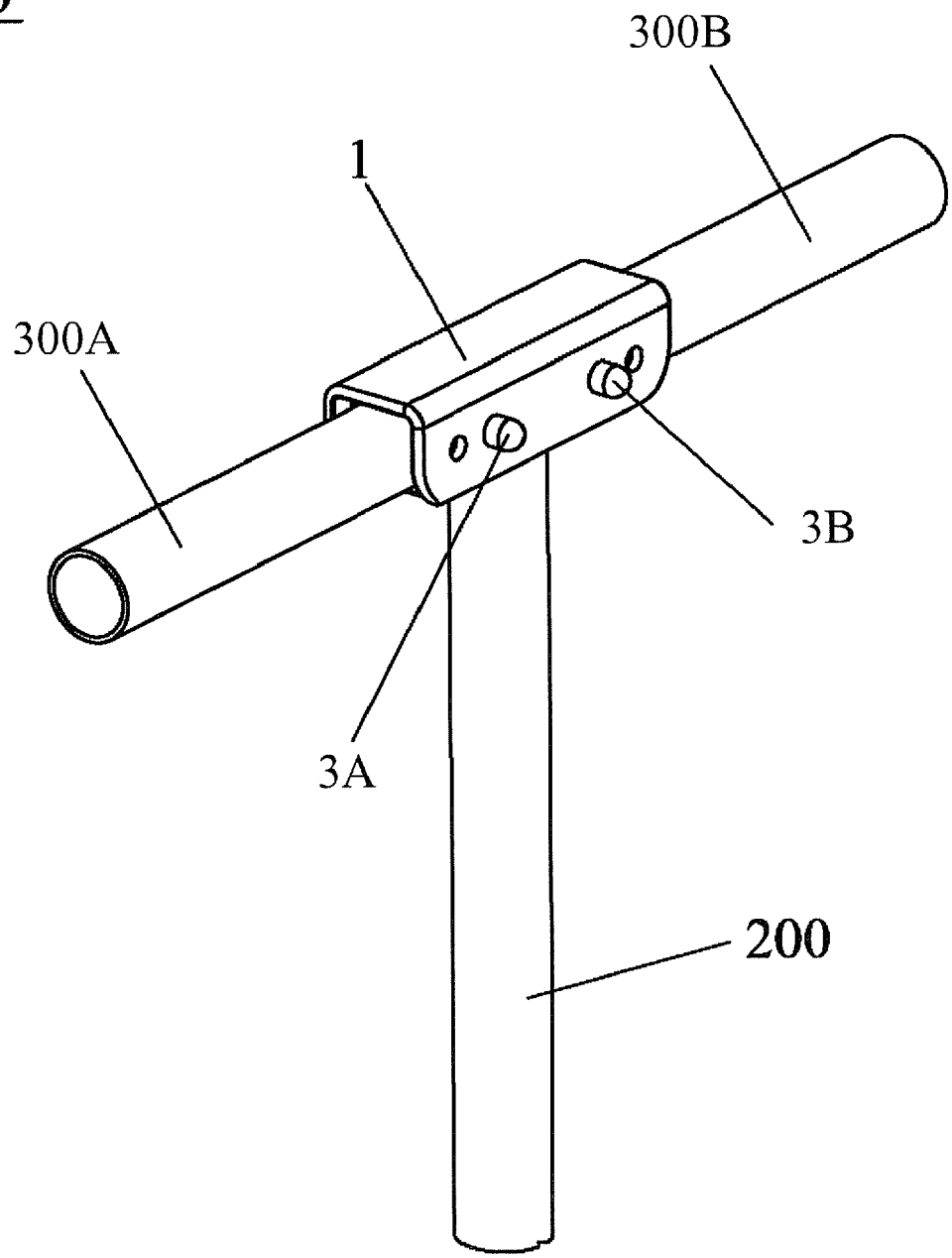
FIG. 7 is a perspective view of a handlebar folding mechanism when both handlebars are unfolded and locked according to one embodiment of the present invention.

FIG. 7 shows a perspective view of a handlebar folding mechanism when both handlebars are unfolded and locked according to one embodiment of the present invention.

Figure 8:
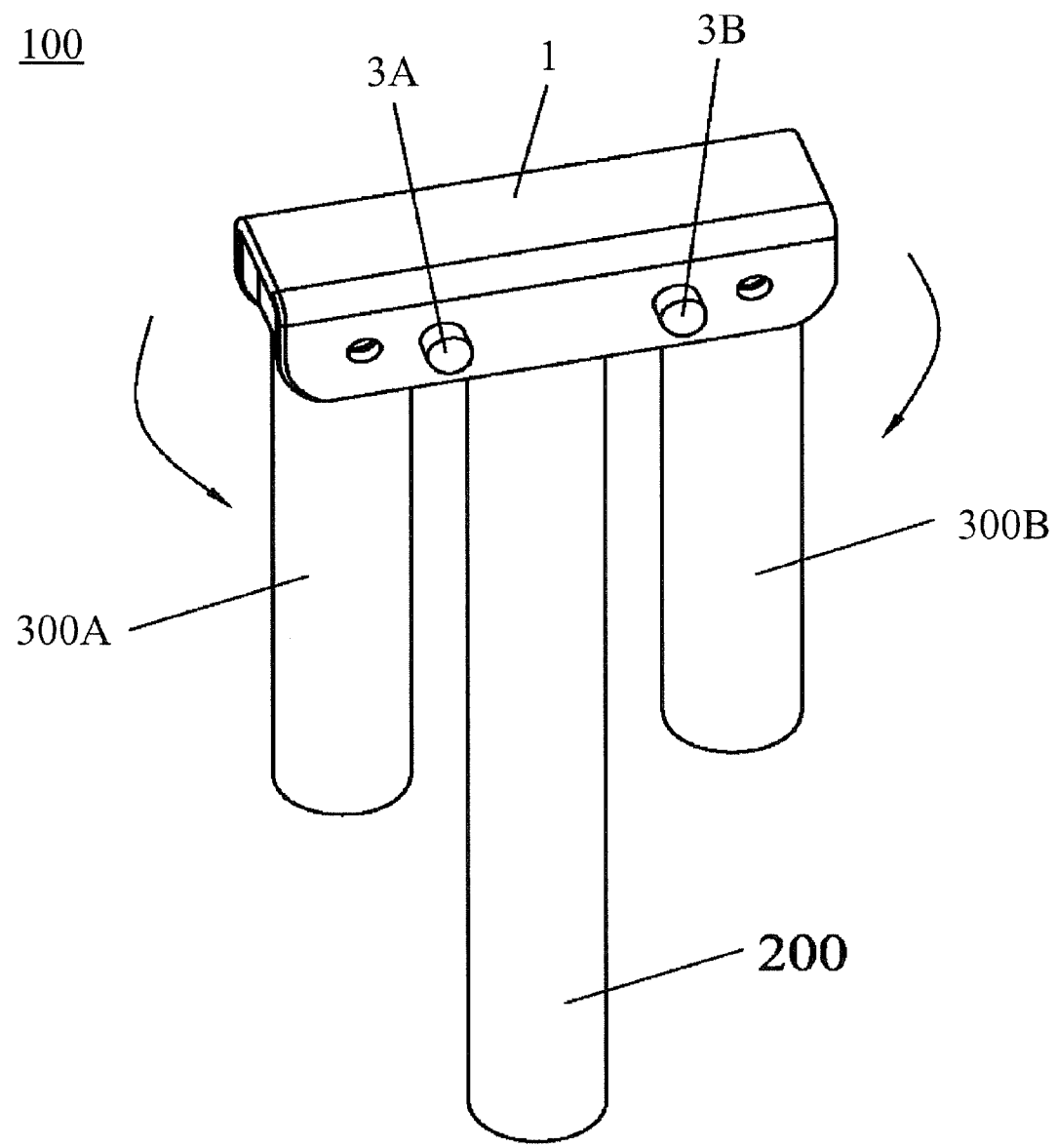
FIG. 8 is a perspective view of a handlebar folding mechanism when both handlebars are folded and locked, according to one embodiment of the present invention.

FIG. 8 shows a perspective view of a handlebar folding mechanism when both handlebars are folded and locked according to one embodiment of the present invention.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:
1. A handlebar folding mechanism for a foldable motorized vehicle comprising:
(a) a mounting base having a first end, a second end, a front sidewall, a rear sidewall, a first pivoting hole, a second pivoting hole, a first locking hole, and a second locking hole;

(b) a first connecting member and a second connecting member, each having a connection portion and a locking portion;

(c) a first locking lever and a second locking lever;

(d) a steering axial rod having a top end and bottom end, wherein the bottom end of the steering axial rod is connected to a front wheel stem of the foldable motorized vehicle, and the top end of the steering axial rod is connected to the center of the mounting base; and (e) a first steering handlebar and a second steering handlebar, each of the steering handlebars having an inside end and outside end, wherein the connection portion of the first connecting member is connected to the inside end of the first steering handlebar, the connection portion of the second connecting member is connected to the inside end of the second steering handlebar, respectively, the locking portion of the first connecting member is pivoted on the first pivoting hole of the mounting base, the locking portion of the second connecting member is pivoted on the second pivoting hole of the mounting base, respectively, the first locking lever is retractably mounted in the first locking hole of the mounting base to control the rotation of the first connecting member, and the second locking lever is retractably mounted in the second locking hole of the mounting base to control the rotation of the second connecting member.

2. The handlebar folding mechanism according to claim 1, wherein (a) a side surface of the locking portion of the first connecting member is recessed along a folding direction of the first steering handlebar to form an arc-shaped sliding portion with each of the sliding portion forming a side edge;

(b) a side surface of the locking portion of the second connecting member is recessed along a folding direction of the second steering handlebar to form an arc-shaped sliding portion with each of the sliding portion forming a side edge;

(c) the sliding portion of the first connecting member protrudes along the folding direction of the first steering handlebar to form a protruding edge;

(d) the sliding portion of the second connecting member protrudes along the folding direction of the second steering handlebar to form a protruding edge;

(e) the protruding edge of the first connecting member divides its sliding portion into two parts, both ends of the protruding edge form a locking slot with a side edge of a recessed part of the sliding portion; and (f) the protruding edge of the second connecting member divides its sliding portion into two parts, both ends of the protruding edge form a locking slot with a side edge of a recessed part of the sliding portion.

3. The handlebar folding mechanism according to claim 2, wherein the first locking lever and the second locking lever protrudes radially to form (a) a front pressing portion at a front end of the first locking lever, wherein the front pressing portion pass through the first locking hole of the front sidewall of the mounting base in an elastically retractable manner, a front pressing portion formed at a front end of the second locking lever, wherein the front pressing portion pass through the second locking hole of the front sidewall of the mounting base in an elastically retractable manner;

(b) a rear pressing portion at a rear end of the first locking lever wherein the rear pressing portion presses against the rear sidewall of the mounting base, a rear pressing portion formed at a rear end of the second locking lever wherein the rear pressing portion presses against the rear sidewall of the mounting base;

(c) a flange corresponding to the locking slot of the first connection member 2A and a flange corresponding to the locking slot of the second connection member; and (d) a release slot for the protruding edge to pass through is formed between the front pressing portion and the flange.

4. The handlebar folding mechanism according to claim 3, wherein the handlebar folding mechanism further comprises a first spring, and a second spring, the first spring is sleeved on the first locking lever and presses between the flange of the first locking lever and the rear sidewall of the mounting base, the second spring is sleeved on the second locking lever and presses between the flange of the second locking lever and the rear sidewall of the mounting base.

5. The handlebar folding mechanism according to claim 4, wherein the locking slot extends and runs through the side edge of the recessed part of the sliding portion.

6. The handlebar folding mechanism according to claim 5, wherein the angle between the two locking slots formed by the two ends of the protruding edge and the side edges of the recessed part of the sliding portion is about 90°.

7. The handlebar folding mechanism according to claim 6, wherein the protruding edge is arc-shaped.

8. The handlebar folding mechanism according to claim 7, wherein when the first locking lever is pressed in against the resilient force of the first spring, the release slot of the first locking lever moves backward towards the rear sidewall of the mounting base along one of the locking slots such that the protruding edge pass through the release slot of the first locking lever and the first handlebar can be rotated, and when the second locking lever is pressed in against the resilient force of the second spring, the release slot of the second locking lever moves backward towards the rear sidewall of the mounting base along one of the locking slots such that the protruding edge pass through the release slot of the second locking lever and the second handlebar can be rotated.

9. A foldable motorized vehicle comprising the handlebar folding mechanism according to claim 1.

* * * * *